(12) United States Patent
Zhang

(10) Patent No.: US 11,192,304 B2
(45) Date of Patent: Dec. 7, 2021

(54) 3D PRINTER WITH EXTENDED SCALE

(71) Applicant: Jing Zhang, Manhattan Beach, CA (US)

(72) Inventor: Jing Zhang, Manhattan Beach, CA (US)

(*) Notice: Subject to any disclaimer, the term of this patent is extended or adjusted under 35 U.S.C. 154(b) by 521 days.

(21) Appl. No.: 16/134,373

(22) Filed: Sep. 18, 2018

(65) Prior Publication Data
US 2020/0086572 A1    Mar. 19, 2020

(51) Int. Cl.
*B29C 64/277* (2017.01)
*B29C 64/129* (2017.01)
*B33Y 50/02* (2015.01)
*B33Y 10/00* (2015.01)
*B33Y 30/00* (2015.01)
*B29C 64/393* (2017.01)
*B29C 64/245* (2017.01)

(52) U.S. Cl.
CPC ......... *B29C 64/277* (2017.08); *B29C 64/129* (2017.08); *B29C 64/245* (2017.08); *B29C 64/393* (2017.08); *B33Y 10/00* (2014.12); *B33Y 30/00* (2014.12); *B33Y 50/02* (2014.12)

(58) Field of Classification Search
None
See application file for complete search history.

(56) References Cited

U.S. PATENT DOCUMENTS 5,059,359 A * 10/1991 Hull .................. B33Y 50/00
264/401
2019/0070777 A1* 3/2019 Wu .................. B29C 64/135

* cited by examiner

*Primary Examiner* — Matthew J Daniels
*Assistant Examiner* — Paul Spiel
(74) *Attorney, Agent, or Firm* — Xuan Zhang

(57) ABSTRACT

A DLP 3D printer, using a DLP projector to generate two images successively, and using a set of mirrors to deflect the irradiation of the two images through two routs respectively to form a complete image on the curing surface of the solidifiable material. In this manner, the printing area is enlarged without increasing the resolution of the DLP projector.

10 Claims, 7 Drawing Sheets

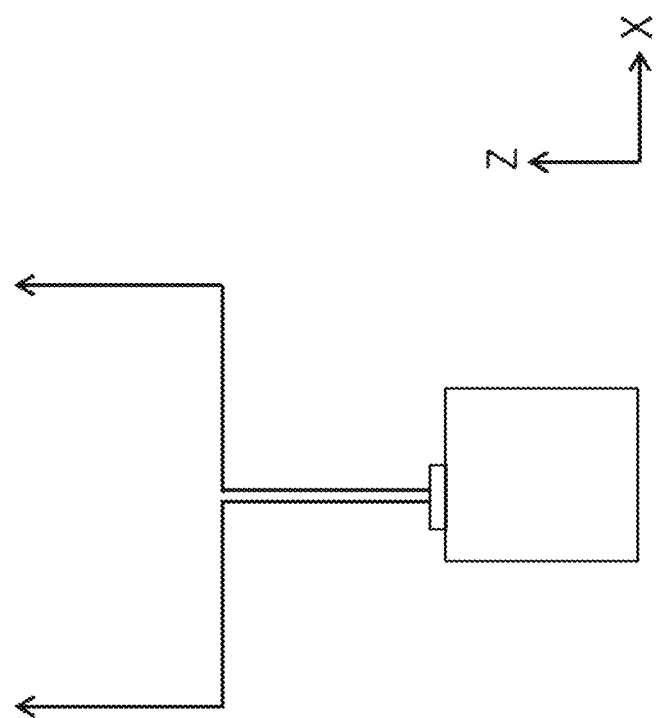

3D PRINTER WITH EXTENDED SCALE

BACKGROUND

1. Field of the Invention

The present invention relates to a 3D printer. More particularly, the 3D printer is based on Digital Light Processing, and the scale is extended by mirrors.

2. Discussion of the Related Art

Three dimensional (3D) printing is a process to form a three-dimension object. Different from traditional processes such as casting and cutting, 3D printing utilizes adding instead of removing materials to form the solid object which could have complex shape or geometry. This process is also known as additive manufacturing (AM), rapid prototyping or solid freeform fabrication. The machine to perform the process is called 3D printer.

Basically, 3D printing is achieved by building an object layer by layer from a particular material such as powered metal, droplets of plastic or any other appropriate material. Each of these layers is a thin slice cross-section of the eventual object which is generated by process similar to regular 2D printing in x and y dimensions. All layers are laid over successively in z dimension. With the thickness of these layers accumulated, a 3D object is formed.

There are number of different technologies developed based on different materials and the ways to form the layers, for example, Fused Deposition Modeling (FDM), Stereolithography (SLA), 3D Inkjet Powder (3DP), Selective Laser Sintering (SLS).

Digital Light Processing (DLP) is one of the well developed technologies recognized by its relatively high resolution and high speed. In this process, liquid solidifiable material (e.g., photopolymer resin) contained in a vat is exposed to visible light or UV light generated by DLP projector. The DLP projector displays the image of the 3D model onto the surface of the liquid solidifiable material. The exposed solidifiable material is solidified (or cured) to form a solid layer with desired pattern according to the image. Then the object is drawn away from the surface to let the liquid solidifiable material to fill in for next layer. By repeating the process a new layer is formed over previous layer until the 3D object is complete. Compare with SLA which uses a UV laser beam to cure the photopolymer resin spot by spot, DLP generates irradiation over its display area simultaneously to tremendously increase the curing speed. At the same time, benefiting from the projector technology, high resolution is available.

There are two ways to cure solidifiable material in DLP. One is called "top-down" in which new layers are formed at the top surface of the growing object. The other technique is called "bottom-up" in which new layers are formed at the bottom surface of the growing object.

Although DLP is already widely used and is available for desk-top printing, the application in commercial level is still limited. One of the disadvantages is the dimension of the objects.

Since the light source is DLP projector, the size of the object in x and y dimension is limited by the display area of the projector. DLP projector uses one or more micro-mirror array to reflect light, which is based on optical micro-electro-mechanical technology. The resolution of 3D printing parts relies on the size of a pixel which is projected by each micro mirror respectively, and the display area depends on the number of the micro-mirror. Therefore in order to increase the display area of the DLP projector will tremendously increase the cost. It would be desirable to provide an apparatus and method in 3D printing to enlarge the object dimension based on current projecting devices.

BRIEF SUMMARY OF THE INVENTION

The primary objective of the present invention is to develop a 3D printer and method applicable in commercial applications.

Another objective of the present invention is to develop a 3D printer and method to fabricate objects with large dimensions.

Another objective of the present invention is to develop a 3D printer and method to fabricate objects with high speed.

Another objective of the present invention is to develop a 3D printer without increasing the cost.

The invention comprises the following, in whole or part:

An irradiation component, a solidifiable material container, a supporting component, and a control system.

The solidifiable material container contains the liquid solidifiable material.

The supporting component provides a substrate for the solidifiable material to be solidified over it to form the object, and levels the solidified lay of the object at a desired position.

The irradiation component comprises a DLP projector, a supporting frame, a switching mirror, a first deflection mirror, and a second deflection mirror. The DLP projector generates irritation on the switching mirror. The switching mirror reflects the irritation to the first deflecting mirror and the second deflecting mirror respectively by moving to the first position and the second position. The first deflecting mirror then deflects the irritation to the first area of the solidified lay of the object, and the second deflecting mirror deflects the irritation to the second area of the solidified lay of the object.

The control system provides data to the DLP projector for generating desired patterns, and controls the DLP projector, the supporting component, and the switching mirror to cooperate together.

The solidifiable material container and the supporting component are used to realize "top-down" or "bottom-up" DLP 3D printing.

For a more complete understanding of the present invention with its objectives and distinctive features and advantages, reference is now made to the following specification and to the accompanying drawings.

BRIEF DESCRIPTION OF THE DRAWINGS

FIG. 7 illustrate the rout of the irradiation according to an alternative embodiment of the invention.

DETAILED DESCRIPTION OF THE INVENTION

Figure 1:
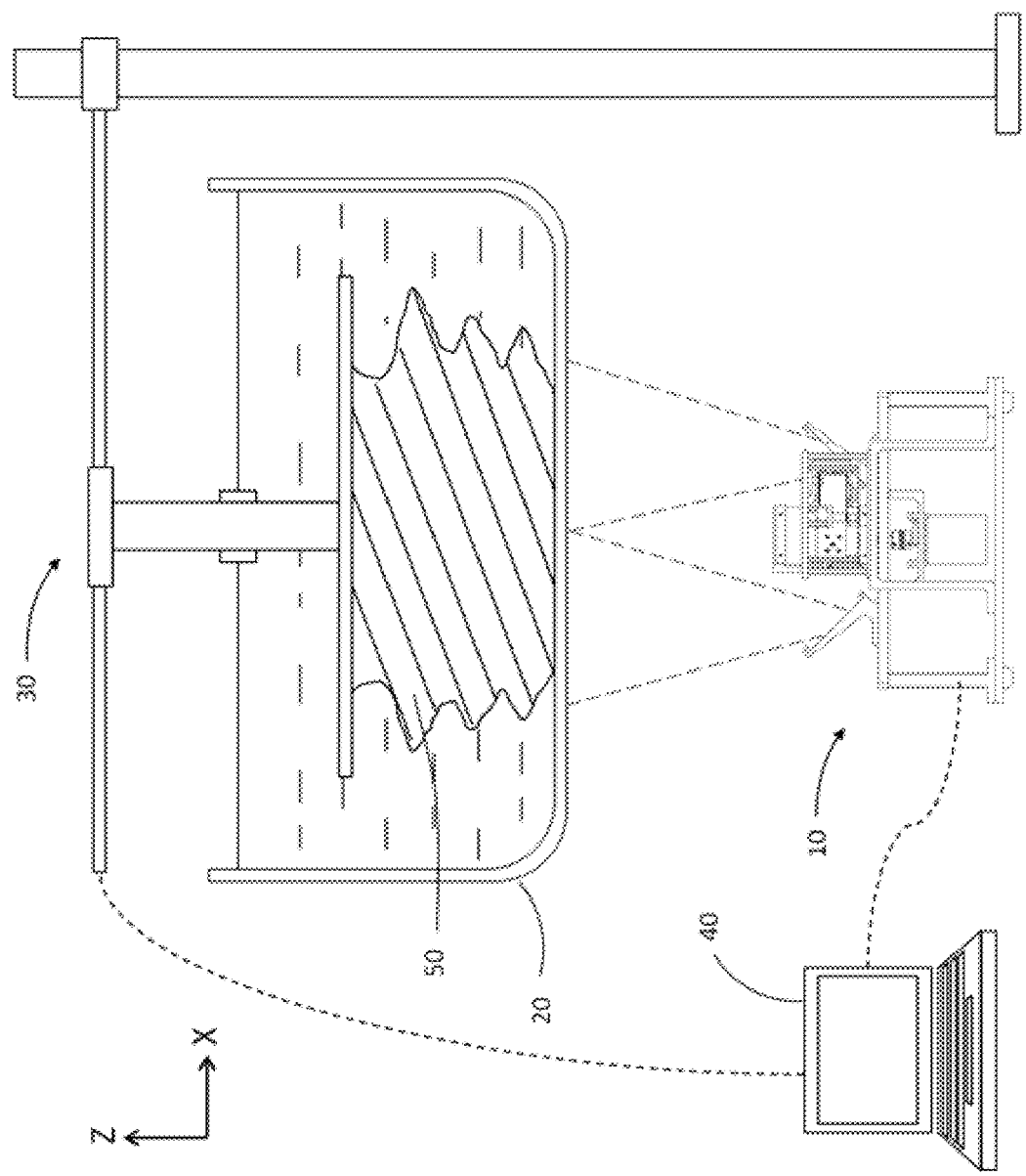
FIG. 1 is a schematic view of a 3D printer according to the present embodiment of the invention.

In accordance with a preferred embodiment, FIGS. 1 to 4 depict the 3D printer as a presently embodiment, wherein the 3D printer comprises an irradiation component 10, a solidifiable material container 20, a supporting component 30, and a control system 40. A 3D object 50 is under printing.

The irradiation component 10 comprises a DLP projector 11 which generates desired irradiation. In a preferred embodiment, the DLP projector 11 generates visible light, UV light, or other forms of light.

The solidifiable material container 20 contains solidifiable material which can be solidified by the irradiation generated by the DLP projector 11. In a preferred embodiment, the solidifiable material is a liquid photopolymer resin.

The supporting component 30 provides an object platform for the object 50 to be laid upon, and moves the object vertically to allow a new layer of resin be cured.

Referring to FIG. 1, in a preferred embodiment, the "bottom-up" technique is employed, the irradiation component 10 is under the solidifiable material container 20, and the new layer of the object is formed at the bottom. Alternatively, "top-down" technique could also be used. A detailed description is omitted here for brevity.

Figure 2:
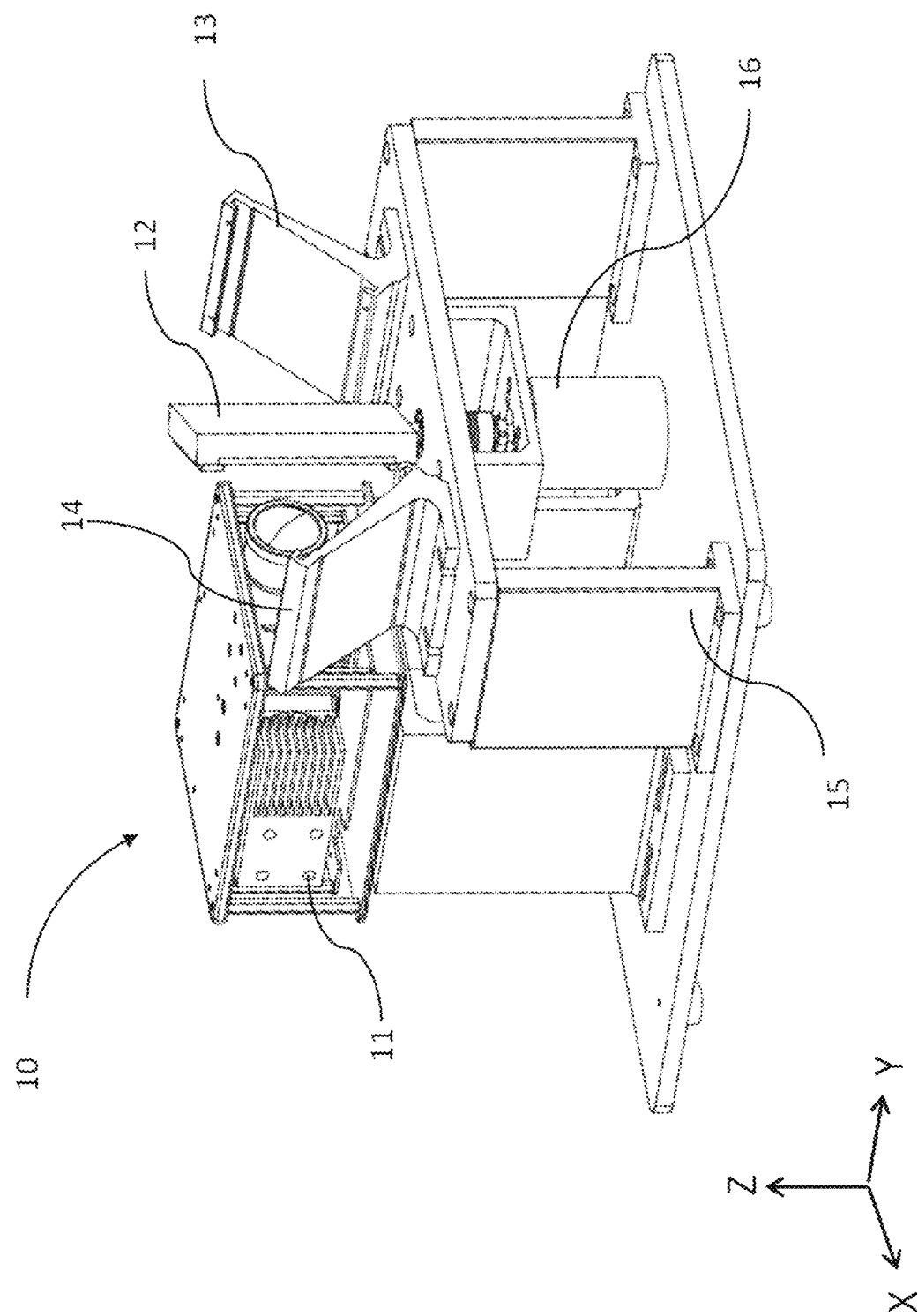
FIG. 2 is a perspective view of the irradiation component of the 3D printer according to the present embodiment of the invention.
Figure 3:
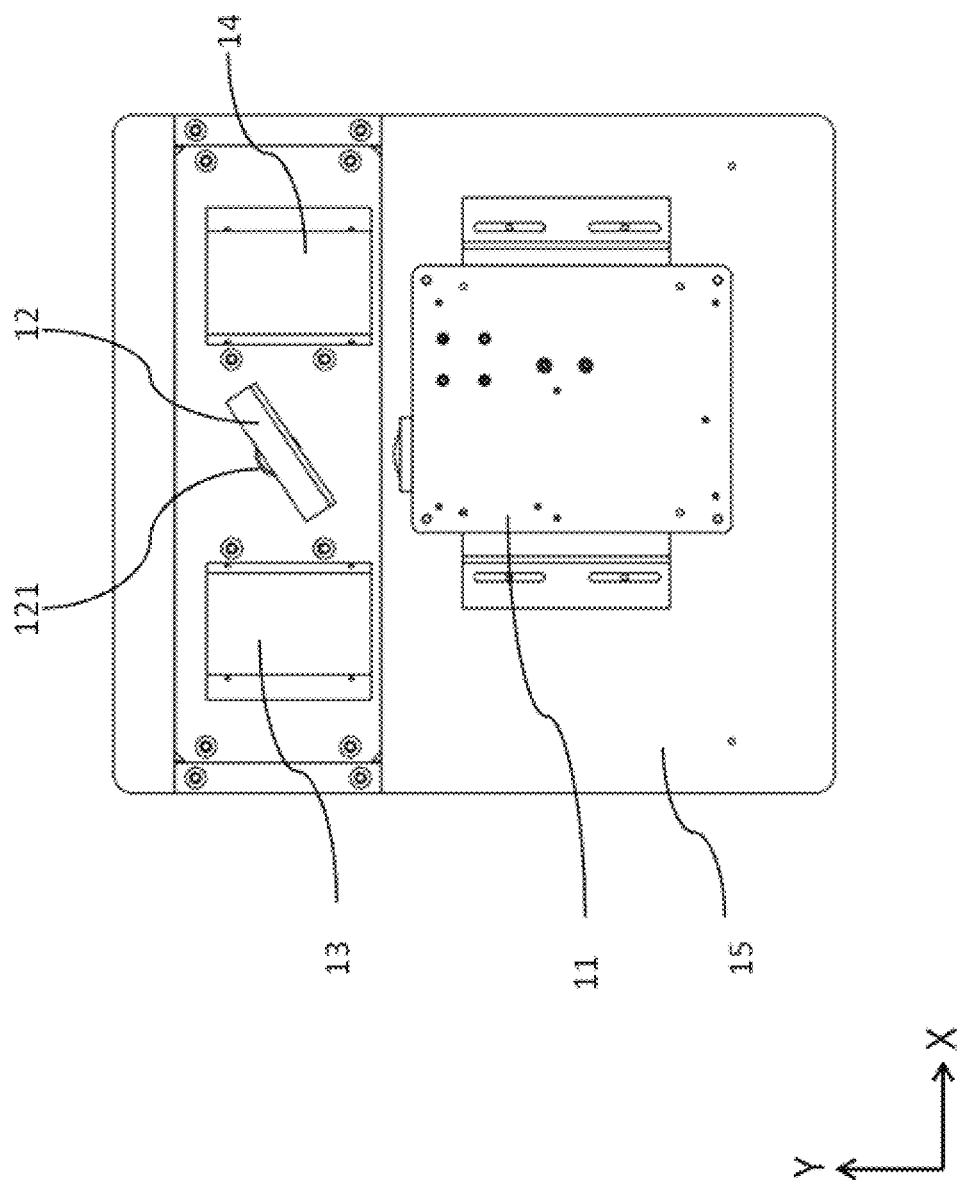
FIG. 3 is a top view of the irradiation component of the 3D printer according to the present embodiment of the invention.
Figure 4:
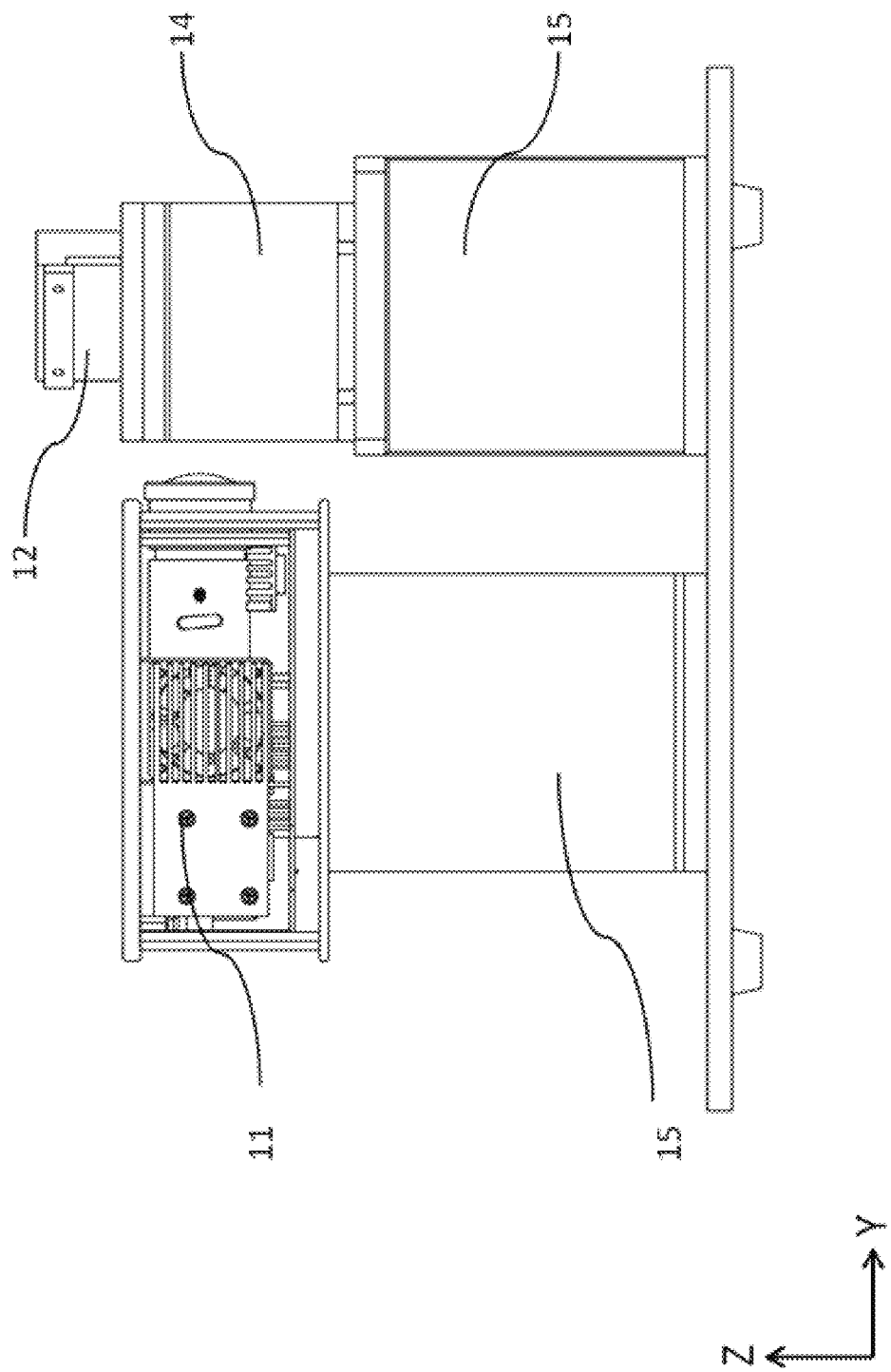
FIG. 4 is a side view of the irradiation component of the 3D printer according to the present embodiment of the invention.

Referring to FIGS. 2 to 4, the irradiation component 10 further comprises a switching mirror 12, a first deflection mirror 13, a second deflection mirror 14, and a supporting frame 15. The DLP projector 11, the first deflection mirror 13, and the second deflection mirror 14 are fixed on the supporting frame 15. The switching mirror 12 is rotatably attached on the supporting frame 15, therefore the switching mirror 12 can be switched to a first position and a second position. In the first position, the switching mirror 12 reflects the irradiation generated by the DLP projector 11 to the first deflection mirror 13; and in the second position, the switching mirror 12 reflects the irradiation generated by the DLP projector 11 to the second deflection mirror 14.

According to the preferred embodiment of the present invention, the DLP projector 11 is laying on a horizontal plane of the supporting frame 15, and the direction of the irradiation is horizontal. The switching mirror 12 is aligned to stand vertically at the route of the irradiation. Facing the DLP projector 11, the switching mirror 12 is able to spin left to a first position, and spin right to a second position. At the first position, the surface of the switching mirror 12 has a 45° angle with the direction of the irradiation, so the irradiation will be deflected 90° to the left; at the second position, the surface of the switching mirror 12 has a 45° angle with the direction of the irradiation, so the irradiation will be deflected 90° to the right.

The first deflection mirror 13 is aligned on the left of the switching mirror 12. The surface of the first deflection mirror 13 has a 45° angle with the horizontal plane, and faces the switching mirror 12. Therefore when the switching mirror 12 is at the first position, the irradiation will be deflected horizontally to the first deflection mirror 13, and further be deflected vertically to irradiate the first area at the bottom of the solidifiable material container 20.

Figure 6:
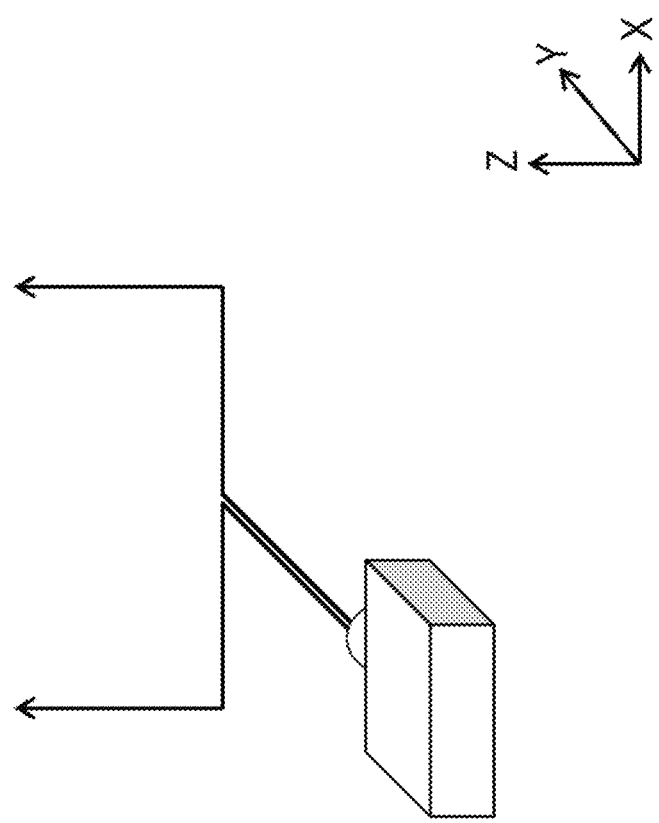
FIG. 6 illustrate the rout of the irradiation according to the present embodiment of the invention.

The second deflection mirror 14 is aligned on the right of the switching mirror 12. The surface of the second deflection mirror 14 has a 45° angle with the horizontal plane, and faces the switching mirror 12. Therefore when the switching mirror 12 is at the second position, the irradiation will be deflected horizontally to second first deflection mirror 14, and further be deflected vertically to irradiate the second area at the bottom of the solidifiable material container 20. FIG. 6 illustrates the route of the irradiation.

The DLP projector 11 can generate two images. The first image will be deflected by the switching mirror 12 at the first position, and deflected by the first deflection mirror 13 to project on the first area; the second image will be deflected by the switching mirror 12 at the second position, and deflected by the second deflection mirror 14 to project on the second area. These two images are aligned side by side to form one image. In this way the display area of the DLP projector is doubled, and the object's dimension of 3D printing is enlarged.

Referring to FIG. 3, the centers of the first deflection mirror 13, the switching mirror 12, and the second deflection mirror 14 are aligned in a straight line which is perpendicular to the direction of the DLP projector 11 irradiation. Also, referring to FIG. 4, the centers of the projector lens, the first deflection mirror 13, the switching mirror 12, and the second deflection mirror 14 are leveled at the same horizontal plane.

Figure 5:
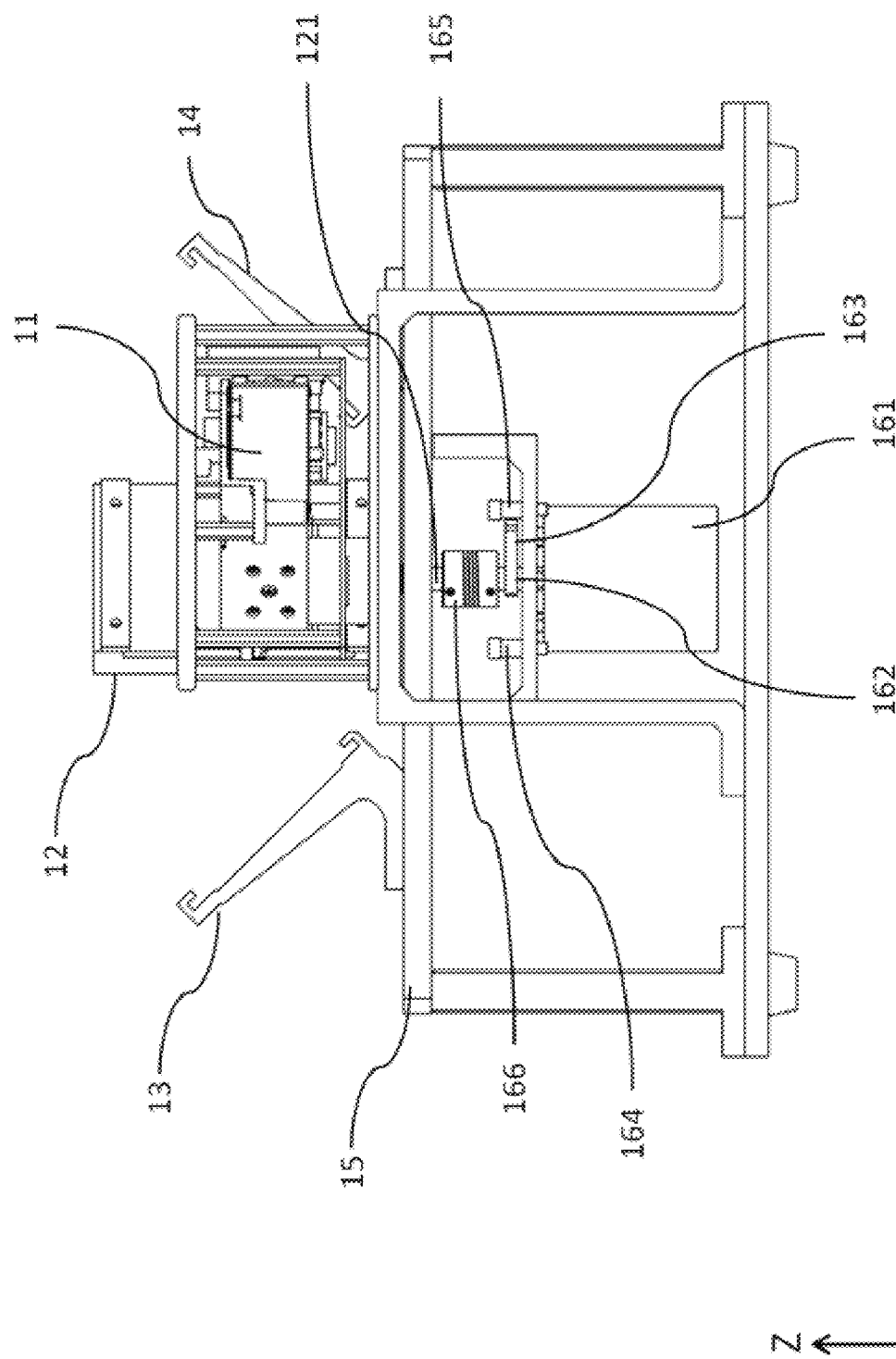
FIG. 5 is a back view of the irradiation component of the 3D printer according to the present embodiment of the invention.

Referring to FIGS. 3 to 5, the irradiation component 10 also comprises a switching element 16 to switch the switching mirror 12 between the first position and the second position. In a preferred embodiment, the switching element 16 comprises a rotary solenoid 161 with an axle 162, a rotate arm 163, and two stop screws 164, 165. The axle 162 of the rotary solenoid 161 is coupled with the switching mirror 12 at the center thereof, in this way the switching mirror 12 can be rotated at the horizontal direction by the rotary solenoid 161. The rotate arm 163 is also coupled on the axle 162. Referring to FIG. 5, the rotary solenoid 161 and the two stop screws 164,165 are fixed on the supporting frame 15. The rotation of the rotary solenoid 161 will be limited by the stop screws 164, 165 through the rotate arm 163. In the preferred embodiment, the switching mirror 12 will stay at the first position when the rotate arm 163 is stopped by the first stop screw 164; and the switching mirror 12 will stay at the second position when the rotate arm 163 is stopped by the second stop screw 165.

It is worth mentioning, the axle 162 of the rotary solenoid 161 may be fixed on the switching mirror 12 at the center. Or alternatively, the switching mirror 12 comprises a pole 121 extended from the center edge thereof, and is coupled with the axle 162 through a coupler 163. The relative angle of the switching mirror 12 and the axle 162 is adjustable, therefore the switching mirror 12 can be aligned to stop at the first and second position accurately. Besides the rotary solenoid, other mechanism, such as two way motor, electric relay, etc. can also be used as switching element.

Referring to FIG. 7, in an alternative embodiment for bottom-up printing, the DLP projector 11 is fixed on a vertical plane of the supporting frame 16 to provide irradiation upward. The switching mirror 12 is suspended horizontally at the route of the irradiation. The surface of the switching mirror 12 can tilt 45° facing left which is its first position; and tilt 45° facing right at its second position. The first deflection mirror 13 stands on the left of the switching mirror 12 having a 45° angle with the horizontal plane; and the second deflection mirror 14 stands on the right of the switching mirror 12 having a 45° angle with the horizontal plane.

It is worth mentioning, the embodiments described above only demonstrate bottom-up printing. In order to perform top-down printing, the whole irradiation component 10 can be turned over to provide irradiation downward.

While the embodiments and alternatives of the invention have been shown and described, it will be apparent to one skilled in the art that various other changes and modifications can be made without departing from the spirit and scope of the invention.

What is claimed is:

1. A DLP (digital light processing) 3D printer, comprising:
   a solidifiable material container containing a solidifiable material;
   a supporting component supporting and moving said solidifiable material vertically for continuous printing;
   an irradiation component comprising a DLP projector to generate irradiation; a switching mirror; a first deflection mirror; and a second deflection mirror; wherein said switching mirror reflects the irradiation to said first and said second deflection mirrors respectively, and said first and said second deflection mirrors deflect the irradiation to a solidification surface of said solidifiable material side by side; and
   a control system providing data to said irradiation component to generate irradiation, and controlling movement of said switching mirror, and said supporting component, wherein said switching mirror switches to a first position to reflect irradiation to said first deflection mirror; and switches to a second position to reflects irradiation to said second deflection mirror, wherein said irradiation component comprises a supporting frame, wherein said DLP projector, said first deflection mirror, and said second deflection mirror are fixed on said supporting frame, and said switching mirror is rotatably attached on said supporting frame to be able to rotate to said first and second positions respectively, wherein said DLP projector is fixed on a horizontal plane of said supporting frame to provide irradiation horizontally, said switching mirror stands vertically at the route of the irradiation; wherein the surface of said switching mirror has a 45° angle to the left of the direction of the irradiation at said first position; and has a 45° angle to the right of the direction of the irradiation at said second position.

2. The DLP 3D printer, as recited in claim 1, wherein said first deflection mirror stands on the left of said switching mirror having a 45° angle with the horizontal plane; and said second deflection mirror stands on the right of said switching mirror having a 45° angle with the horizontal plane.

3. The DLP 3D printer, as recited in claim 2, wherein said irradiation component further comprises a switching element fixed on said supporting frame and coupled with said switching mirror to rotate said switching mirror horizontally between said first position and said second position.

4. The DLP 3D printer, as recited in claim 3, wherein said switching element is a rotary solenoid having an axle wherein said axle is coupled with said switching mirror.

5. The DLP 3D printer, as recited in claim 4, wherein said switching element further comprises a rotate arm coupled on said axle; a first and a second stop screws fixed on said supporting frame wherein said rotate arm can be stopped by said first stop screw to keep said switching mirror at said first position; and can be stopped by said second stop screw to keep said switching mirror at said second position.

6. The DLP 3D printer, as recited in claim 5, where said first and second deflection mirror face upward for bottom-up printing.

7. The DLP 3D printer, as recited in claim 5, where said first and second deflection mirror face downward for top-down printing.

8. A DLP (digital light processing) 3D printer, comprising:
   a solidifiable material container containing a solidifiable material;
   a supporting component supporting and moving said solidifiable material vertically for continuous printing;
   an irradiation component comprising a DLP projector to generate irradiation; a switching mirror; a first deflection mirror; and a second deflection mirror; wherein said switching mirror reflects the irradiation to said first and said second deflection mirrors respectively, and said first and said second deflection mirrors deflect the irradiation to a solidification surface of said solidifiable material side by side; and
   a control system providing data to said irradiation component to generate irradiation, and controlling movement of said switching mirror, and said supporting component, wherein said switching mirror switches to a first position to reflect irradiation to said first deflection mirror; and switches to a second position to reflects irradiation to said second deflection mirror, wherein said irradiation component comprises a supporting frame, wherein said DLP projector, said first deflection mirror, and said second deflection mirror are fixed on said supporting frame, and said switching mirror is rotatably attached on said supporting frame to be able to rotate to said first and second positions respectively, wherein said DLP projector is fixed on a vertical plane of said supporting frame to provide irradiation vertically, said switching mirror extends horizontally at the route of the irradiation; wherein the surface of said switching mirror has a 45° angle with the horizontal plane facing left at said first position; and has a 45° angle with the horizontal plane facing right at said second position; wherein said first deflection mirror stands on the left of said switching mirror having a 45° angle with the horizontal plane; and said second deflection mirror stands on the right of said switching mirror having a 45° angle with the horizontal plane, wherein said irradiation component further comprises a switching element fixed on said supporting frame and coupled with said switching mirror to rotate said switching mirror between said first position and said second position, wherein said switching element is a rotary solenoid having an axle wherein said axle is coupled with said switching mirror, wherein said switching element further comprises a rotate arm coupled on said axle; a first and a second stop screws fixed on said supporting frame wherein said rotate arm is stopped by said first stop screw to keep said switching mirror at said first position; and is stopped by said second stop screw to keep said switching mirror at said second position.

9. The DLP 3D printer, as recited in claim 8, where said first and second deflection mirror face upward for bottom-up printing.

10. The DLP 3D printer, as recited in claim 8, where said first and second deflection mirror face downward for top-down printing.

* * * * *